US012525671B2

(12) United States Patent
Kale et al.

(10) Patent No.: US 12,525,671 B2
(45) Date of Patent: Jan. 13, 2026

(54) BATTERY WELDS

(71) Applicant: Rivian IP Holdings, LLC, Irvine, CA (US)

(72) Inventors: Varun Milind Kale, Normal, IL (US); Bryce Fredrick Alexander Beecher, Bloomington, IL (US); Tianyue Gao, Fremont, CA (US); Ning Kang, Irvine, CA (US); Jingsi Yang, Irvine, CA (US); Rajeev Dhiman, Pleasanton, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 69 days.

(21) Appl. No.: 18/458,984

(22) Filed: Aug. 30, 2023

(65) Prior Publication Data
US 2025/0007106 A1 Jan. 2, 2025

Related U.S. Application Data

(60) Provisional application No. 63/511,609, filed on Jun. 30, 2023.

(51) Int. Cl.
H01M 50/152 (2021.01)
H01M 50/107 (2021.01)
(Continued)

(52) U.S. Cl.
CPC ....... H01M 50/152 (2021.01); H01M 50/107 (2021.01); H01M 50/213 (2021.01);
(Continued)

(58) Field of Classification Search
CPC ............. H01M 50/588; H01M 50/204; H01M 50/213; H01M 50/24; H01M 50/249;
(Continued)

(56) References Cited

U.S. PATENT DOCUMENTS 5,495,889 A 3/1996 Dubelloy
5,977,859 A 11/1999 Kawamura
(Continued)

FOREIGN PATENT DOCUMENTS

FR 2705085 11/1994
JP 2009009852 A * 1/2009 .......... H01M 2/0225
(Continued)

OTHER PUBLICATIONS

English translation of JP-2009009852-A (Year: 2009).*

Primary Examiner — Ula C Ruddock
Assistant Examiner — Sarika Gupta
(74) Attorney, Agent, or Firm — BAKERHOSTETLER

(57) ABSTRACT

Aspects of the subject disclosure relate to various features of a battery subassembly, such as a battery module. The battery subassembly may be implemented in an electric vehicle or in a building. In one or more implementations, the battery subassembly may include a battery cell having a peripheral rim having a first width and forming a terminal for the battery cell; and at least one weld configured to couple the peripheral rim to a connector, in which the at least one weld has a second width that is larger than the first width.

18 Claims, 15 Drawing Sheets

(51) Int. Cl.
    *H01M 50/213*    (2021.01)
    *H01M 50/24*     (2021.01)
    *H01M 50/583*    (2021.01)
    *H01M 50/664*    (2021.01)

(52) U.S. Cl.
    CPC ......... *H01M 50/24* (2021.01); *H01M 50/583* (2021.01); *H01M 50/664* (2021.01); *H01M 2220/20* (2013.01)

(58) Field of Classification Search
    CPC ............ H01M 50/262; H01M 50/271; H01M 50/296; H01M 50/503; H01M 50/505; H01M 50/507; H01M 50/516; H01M 50/526; H01M 50/536; H01M 50/583; H01M 50/664; H01M 2200/103; H01M 2220/20; B60K 1/04; B60K 2001/0422; B60K 2001/0433; B60L 50/64; B60L 50/66; B60N 2/005; Y02E 60/10
    See application file for complete search history.

(56) References Cited

U.S. PATENT DOCUMENTS

| | | | |
|---|---|---|---|
| 8,580,428 | B2 | 11/2013 | Kiyama |
| 8,897,010 | B2 | 11/2014 | Shepard |
| 8,991,478 | B2 | 3/2015 | Zaffetti |
| 8,999,548 | B2 | 4/2015 | Sun et al. |
| 9,147,875 | B1 | 9/2015 | Coakley |
| 9,545,010 | B2 | 1/2017 | Coackley et al. |
| 9,568,257 | B2 | 2/2017 | Moruzzi |
| 9,844,148 | B2 | 12/2017 | Coakley |
| 10,180,289 | B2 | 1/2019 | Vanderwees |
| 10,211,443 | B2 | 2/2019 | Coackley et al. |
| 10,297,813 | B2 | 5/2019 | Takano |
| 10,714,730 | B2 | 7/2020 | Tyler et al. |
| 10,964,931 | B2 | 3/2021 | Coackley et al. |
| 11,116,070 | B2 | 9/2021 | Coakley |
| 11,133,538 | B2 | 9/2021 | Ge et al. |
| 11,134,590 | B2 | 9/2021 | Wang |
| 11,201,364 | B2 | 12/2021 | Kawakami |
| 11,302,997 | B2 | 4/2022 | Wynn et al. |
| 11,894,580 | B2 | 2/2024 | Coakley |
| 11,979,976 | B2 | 5/2024 | Coakley |
| 12,035,459 | B2 | 7/2024 | Coakley |
| 12,040,511 | B2 | 7/2024 | Coakley |
| 2011/0008654 | A1 | 1/2011 | Kim |
| 2011/0027644 | A1* | 2/2011 | Kiyama .............. H01M 50/572 29/623.2 |
| 2011/0095859 | A1 | 4/2011 | Shibata |
| 2012/0003508 | A1 | 1/2012 | Narbonne |
| 2012/0107663 | A1 | 5/2012 | Burgers |
| 2013/0071720 | A1 | 3/2013 | Zahn |
| 2013/0244077 | A1 | 9/2013 | Palanchorn |
| 2013/0337291 | A1 | 12/2013 | Mayer |
| 2015/0364744 | A1 | 12/2015 | Takano |
| 2016/0025428 | A1 | 1/2016 | Hendriz |
| 2016/0204486 | A1 | 7/2016 | Kenney |
| 2016/0315304 | A1 | 10/2016 | Biskup |
| 2016/0315365 | A1 | 10/2016 | Vanderwees |
| 2017/0244143 | A1 | 8/2017 | Burgers |
| 2017/0256826 | A1 | 9/2017 | Hong |
| 2018/0205125 | A1 | 7/2018 | Bergers |
| 2018/0252479 | A1 | 9/2018 | Kenney |
| 2018/0294449 | A1 | 10/2018 | Zeng |
| 2018/0337434 | A1 | 11/2018 | Burgers |
| 2018/0375077 | A1 | 12/2018 | Shin |
| 2019/0109357 | A1 | 4/2019 | Kenney |
| 2019/0366876 | A1 | 12/2019 | Cheadle |
| 2020/0067056 | A1 | 2/2020 | Wynn et al. |
| 2020/0076022 | A1 | 3/2020 | Kawakami |
| 2020/0136205 | A1 | 4/2020 | Graves |
| 2020/0185686 | A1 | 6/2020 | Ng |
| 2020/0203941 | A1 | 6/2020 | Ing |
| 2020/0243934 | A1 | 7/2020 | Galvis |
| 2021/0175588 | A1 | 6/2021 | Coackley et al. |
| 2021/0226260 | A1 | 7/2021 | Moon |
| 2021/0242516 | A1 | 8/2021 | Rahim |
| 2021/0247145 | A1 | 8/2021 | Vakilimoghaddam |
| 2021/0254895 | A1 | 8/2021 | Vakilimoghaddam |
| 2022/0021048 | A1 | 1/2022 | Boddakayala |
| 2022/0120518 | A1 | 4/2022 | Vanderwees |
| 2022/0123442 | A1 | 4/2022 | Zu |
| 2022/0131212 | A1 | 4/2022 | Collins |
| 2022/0190445 | A1 | 6/2022 | Wynn et al. |
| 2022/0311103 | A1 | 9/2022 | Findlay et al. |
| 2022/0336883 | A1 | 10/2022 | Galvis |
| 2023/0111495 | A1 | 4/2023 | Jung |
| 2023/0216147 | A1 | 7/2023 | Yoon |
| 2023/0335853 | A1 | 10/2023 | Davis |
| 2023/0378561 | A1 | 11/2023 | Totman |
| 2024/0283071 | A1 | 8/2024 | Feng |

FOREIGN PATENT DOCUMENTS

| | | |
|---|---|---|
| WO | WO 2018/174621 | 9/2018 |
| WO | WO 2019/054765 | 9/2019 |

* cited by examiner

BATTERY WELDS

CROSS REFERENCE TO RELATED APPLICATIONS

This application claims the benefit of priority to U.S. Provisional Patent Application No. 63/511,609, entitled, "Battery Subassembly", filed on Jun. 30, 2023, the disclosure of which is hereby incorporated herein in its entirety.

INTRODUCTION

Batteries are often used as a source of power, including as a source of power for electric vehicles that include wheels that are driven by an electric motor that receives power from the battery.

Aspects of the subject technology can help to improve the efficiency, range, and/or proliferation of electric vehicles, which can help to mitigate climate change by reducing greenhouse gas emissions.

SUMMARY

The present disclosure generally relates to various aspects of a battery subassembly including, for example, battery welds for electrically coupling a terminal of a battery cell to another structure, such as a tab of a current collector assembly (CCA). Aspects of the battery welds described herein can help improve the reliability of the welding processes for connecting battery cells to a CCA, which can improve the reliability and manufacturing yield of battery subassemblies.

In accordance with aspects of the subject technology, an apparatus is disclosed that includes: a battery cell including a peripheral rim having a first width and forming a terminal for the battery cell; and at least one weld configured to couple the peripheral rim to a connector, in which the at least one weld has a second width that is larger than the first width. The at least one weld may extend from an inner radial edge to an outer radial edge of the peripheral rim. The battery cell may also include a gasket disposed at least partially beneath the peripheral rim. The gasket may include an asymmetric portion at a location corresponding to the at least one weld. The at least one weld may extend from a top surface of the peripheral rim, through the peripheral rim, to a bottom surface of the peripheral rim. The at least one weld may extend through the bottom surface of the peripheral rim into a portion of the gasket that is disposed beneath the peripheral rim. The connector may include a tab of a current collector assembly.

The first width may be between 0.5 millimeters and 0.8 millimeters, and the second width may be greater than one millimeter. The at least one weld may include a first set of parallel welds configured to couple the peripheral rim to the connector. The at least one weld may also include a second set of parallel welds configured to couple the peripheral rim to the connector. The at least one weld may also include a third set of parallel welds configured to couple the peripheral rim to the connector.

In accordance with other aspects of the subject technology, a battery subassembly is disclosed that includes a current collector assembly including an electrically conductive layer and a tab extending from the electrically conductive layer; a battery cell including a peripheral rim having a first width and forming a terminal for the battery cell; and at least one weld configured to couple the peripheral rim to the tab, in which the at least one weld has a second width that is larger than the first width. The battery subassembly may also include an additional battery cell including an additional peripheral rim having the first width and forming an additional terminal for the additional battery cell; and at least one additional weld that couples the additional peripheral rim of the additional battery cell to the tab, in which the at least one additional weld has the second width that is larger than the first width.

The battery subassembly may also include a plurality of additional battery cells attached to a plurality of additional respective tabs of the current collector assembly by a plurality of additional respective welds, in which each of the plurality of additional battery cells has a peripheral rim with the first width, each of the plurality of additional respective welds has the second width, and each of a subset of the plurality of additional battery cells includes a gasket having an asymmetric portion. The battery subassembly may also include a plurality of additional battery cells attached to a plurality of additional respective tabs of the current collector assembly by a plurality of additional respective welds, in which each of the plurality of additional battery cells has a peripheral rim with the first width, each of the plurality of additional respective welds has the second width, and each of a subset of the plurality of respective additional welds extends through an entire thickness of a respective peripheral rim of a respective one of the plurality of additional battery cells.

The battery subassembly may also include a plurality of additional battery cells attached to a plurality of additional respective tabs of the current collector assembly by a plurality of additional respective welds, in which each of the plurality of additional battery cells has a peripheral rim with the first width, each of the plurality of additional respective welds has the second width, each of a first group of the plurality of additional respective welds includes two sets of additional welds, and each of a second group of the plurality of additional respective welds includes three sets of additional welds.

In accordance with other aspects of the subject technology, a method is provided that includes: providing a battery cell having a peripheral rim with a first width; aligning a tab of a current collector assembly with a peripheral rim of the battery cell; and welding the tab of the current collector assembly with the peripheral rim of the battery cell by forming at least one weld having a second width greater than the first width between the tab and the peripheral rim. Forming the at least one weld having the second width greater than the first width between the tab and the peripheral rim may include forming two sets of parallel welds, each of the two sets of parallel welds having the second width greater than the first width.

The method may also include performing a testing operation for the battery cell and the tab following the forming of the two sets of parallel welds; and forming, based on a result of the testing operation, a third set of parallel welds between the peripheral rim and the tab, the third set of parallel welds having the second width greater than the first width. Forming the at least one weld having the second width greater than the first width between the tab and the peripheral rim may include melting and partially deforming a portion of a gasket disposed at least partially beneath the peripheral rim.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to battery welds for connecting connectors to battery cell terminals. For example, welds of increased width and/or depth, between a current collector (e.g., foil) to a battery cell (e.g., to the rim and/or the negative terminal of the battery cell), may be provided. Increasing the width of the welds (e.g., relative to the width of the rim of the battery cell) provides an additional margin for the cumulative process variations that can occur during battery module assembly, leading up to welding of the connectors to the battery cells. It has been determined by the inventors that potential effects of providing the wider welds, on other battery cell structures such as a gasket that is secured under the rim, are within acceptable operational and safety thresholds (e.g., even if the wider weld is performed with an offset relative to the rim of the battery cell). The wider welds can significantly increase the yield in battery module production, reduce waste due to scrapping of parts with misaligned welds, and simplify the complexity of assembling one or more battery subassemblies (e.g., including by reducing or removing the use of vision tools for aligning parts for narrower welds).

Figure 1A:
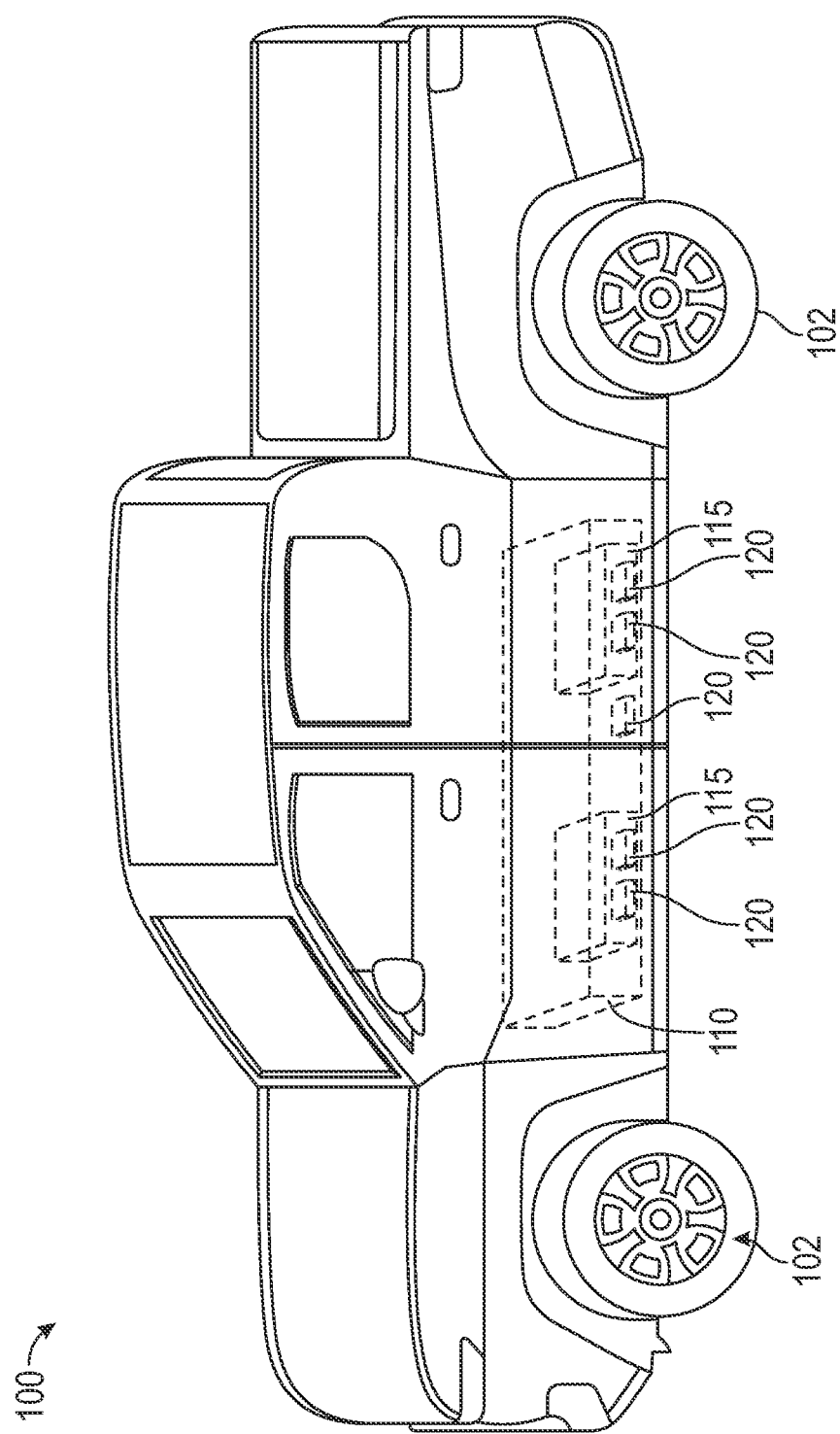
FIGS. 1A and 1B illustrate schematic perspective side views of example implementations of a vehicle having a battery subassembly in accordance with one or more implementations.

FIG. 1A is a diagram illustrating an example implementation of an apparatus as described herein. In the example of FIG. 1A, the apparatus is a moveable apparatus, implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid).

In the example of FIG. 1A, the vehicle 100 is implemented as a truck (e.g., a pickup truck) having a battery pack 110. As shown, the battery pack 110 may include one or more battery subassemblies, for example battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery subassembly, unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

Figure 1B:
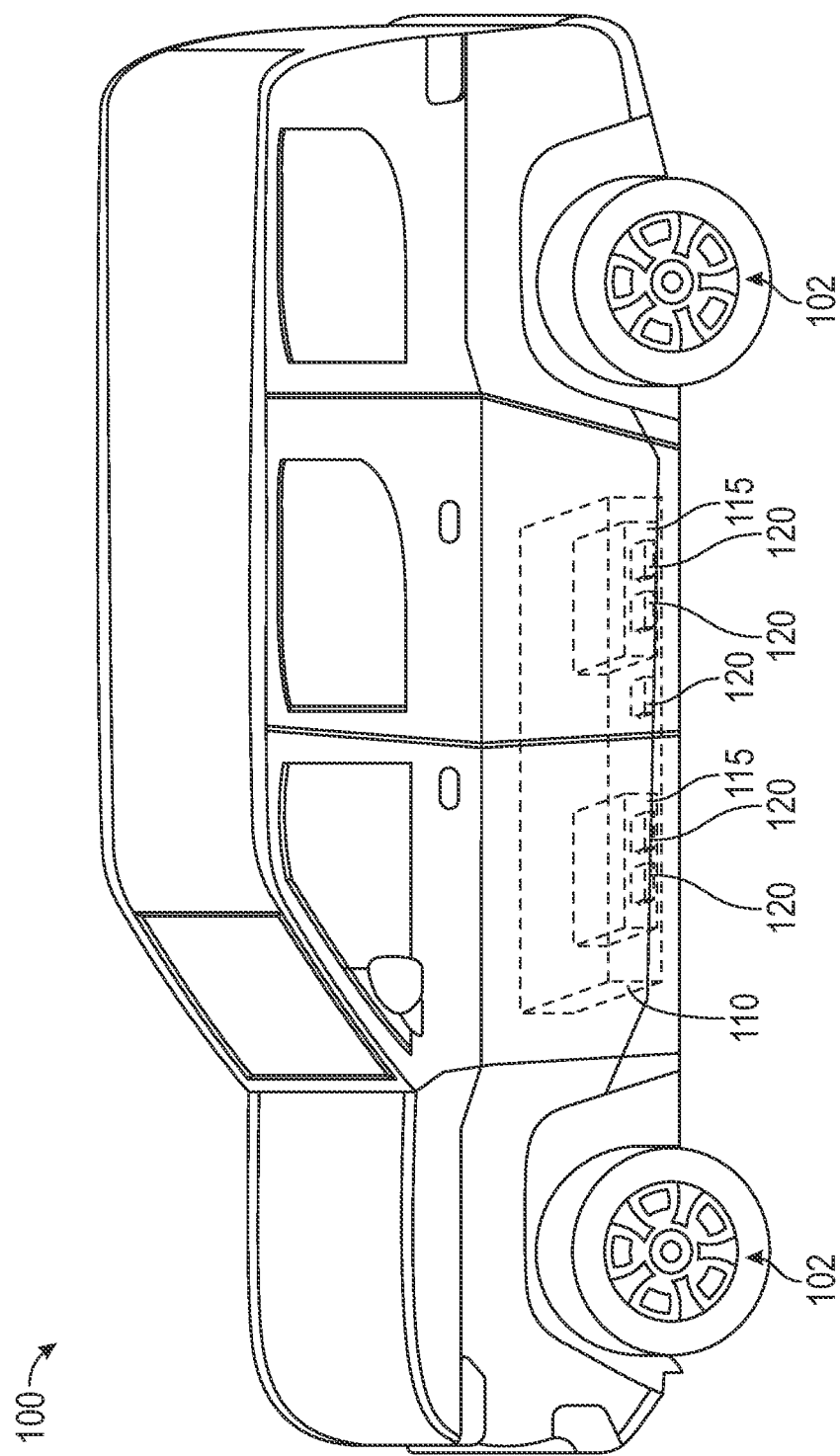

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
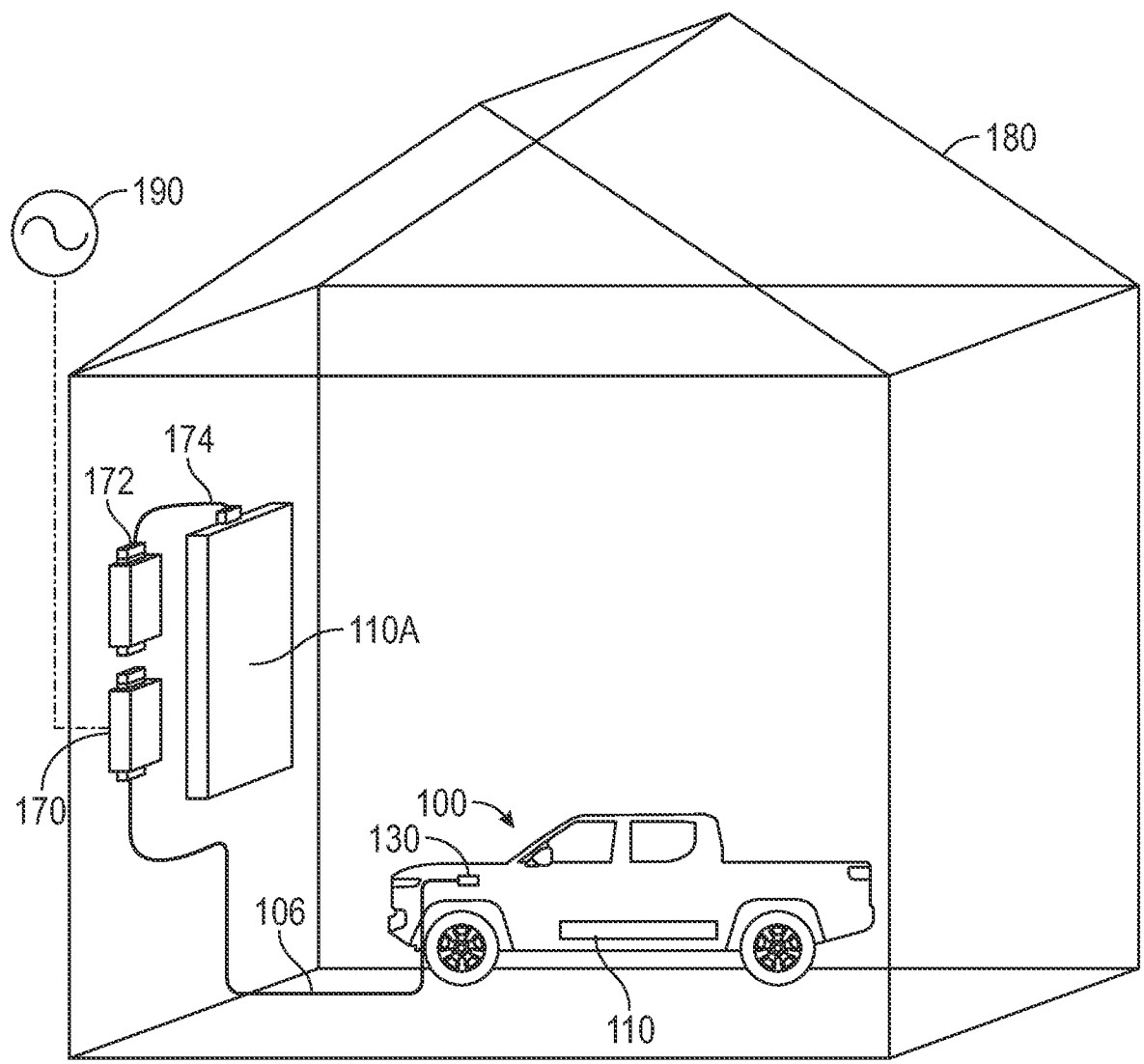
FIG. 1C illustrates a schematic perspective view of a building having a battery subassembly in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180

(e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
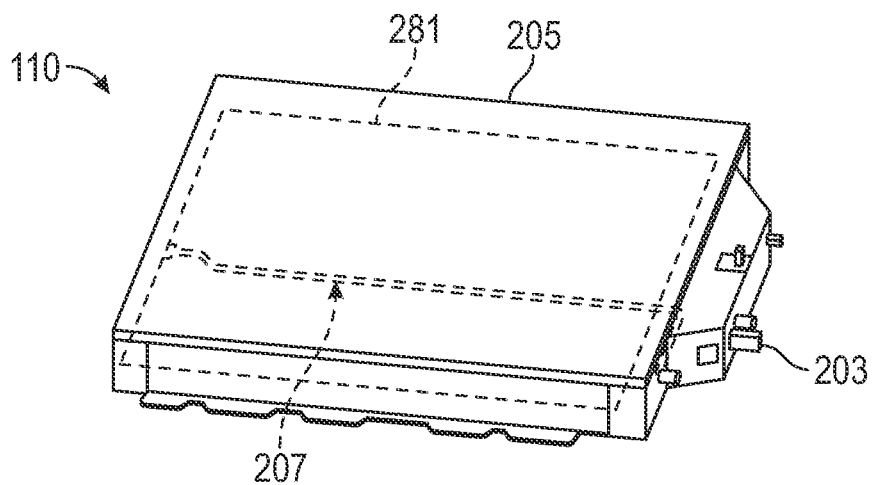
FIG. 2A illustrates a schematic perspective view of a battery subassembly in accordance with one or more implementations.

FIG. 2A depicts an example battery pack 110. Battery pack 110 may include multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110. The battery pack 110 may also include one or more external connection ports, such as an electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180.

As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

In one or more implementations, the battery pack 110 may include one or more thermal control structures 207 (e.g., cooling lines and/or plates and/or heating lines and/or plates). For example, thermal control structures 207 may couple thermal control structures and/or fluids to the battery modules 115, battery units, batteries, and/or battery cells 120 within the battery pack frame 205, such as by distributing fluid through the battery pack 110.

For example, the thermal control structures 207 may form a part of a thermal/temperature control or heat exchange system that includes one or more thermal components 281 such as plates or bladders that are disposed in thermal contact with one or more battery modules 115 and/or battery cells 120 disposed within the battery pack frame 205. For example, a thermal component 281 may be positioned in contact with one or more battery modules 115, battery units, batteries, and/or battery cells 120 within the battery pack frame 205. In one or more implementations, the battery pack 110 may include one or multiple thermal control structures 207 and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
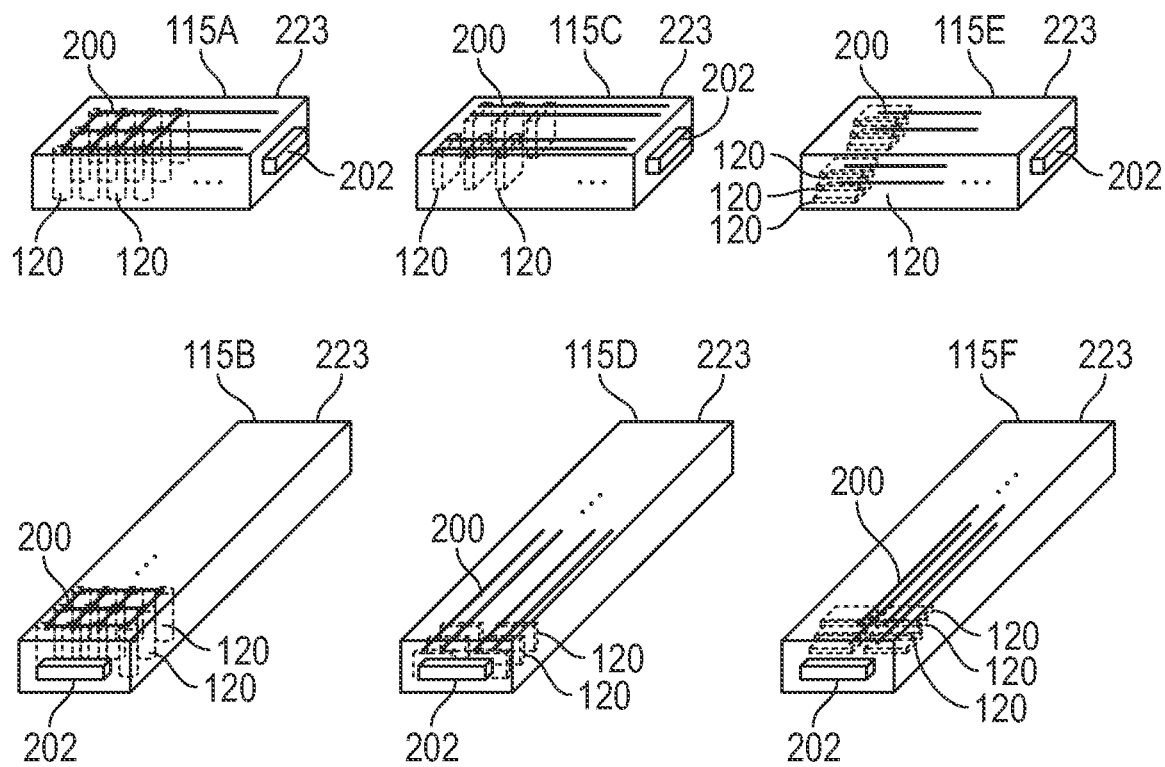
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation).

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

Figure 2C:
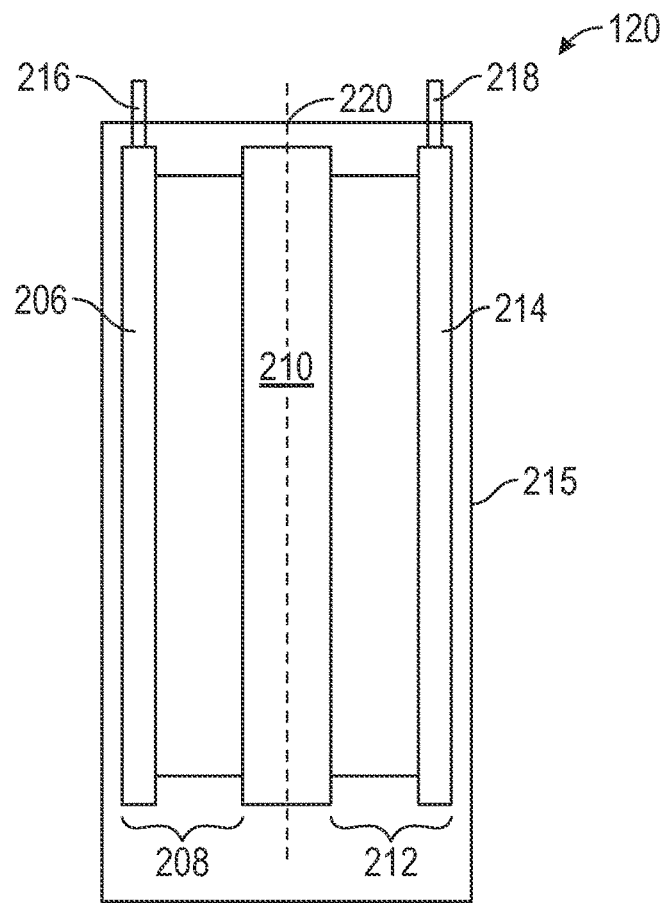
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

Figure 2D:
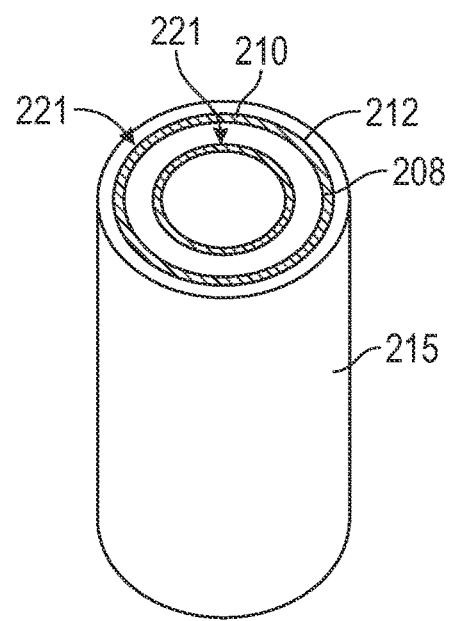
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

Figure 2E:
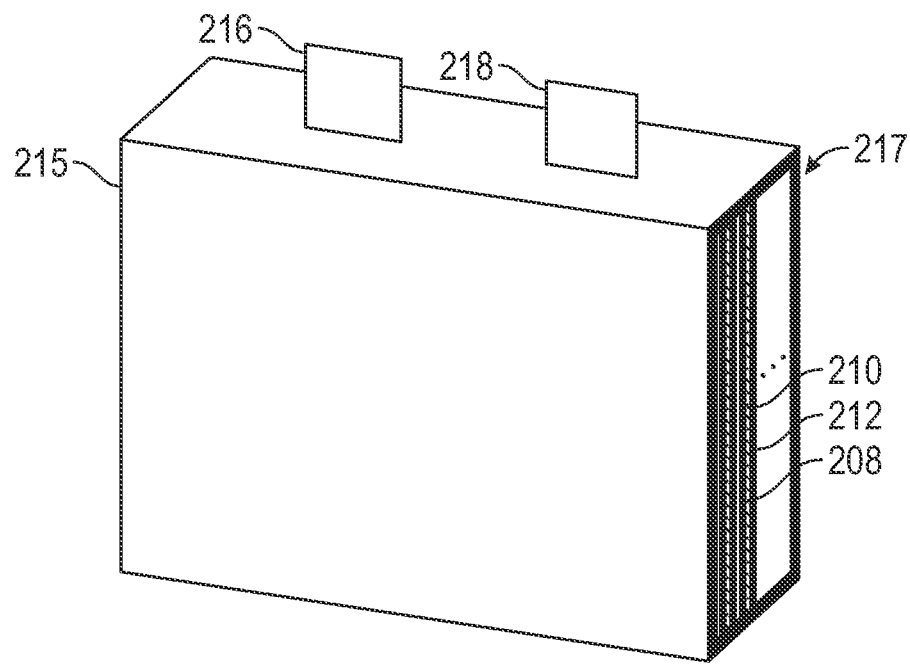
FIG. 2E illustrates a cross-sectional perspective view of a prismatic battery cell in accordance with one or more implementations.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

Figure 2F:
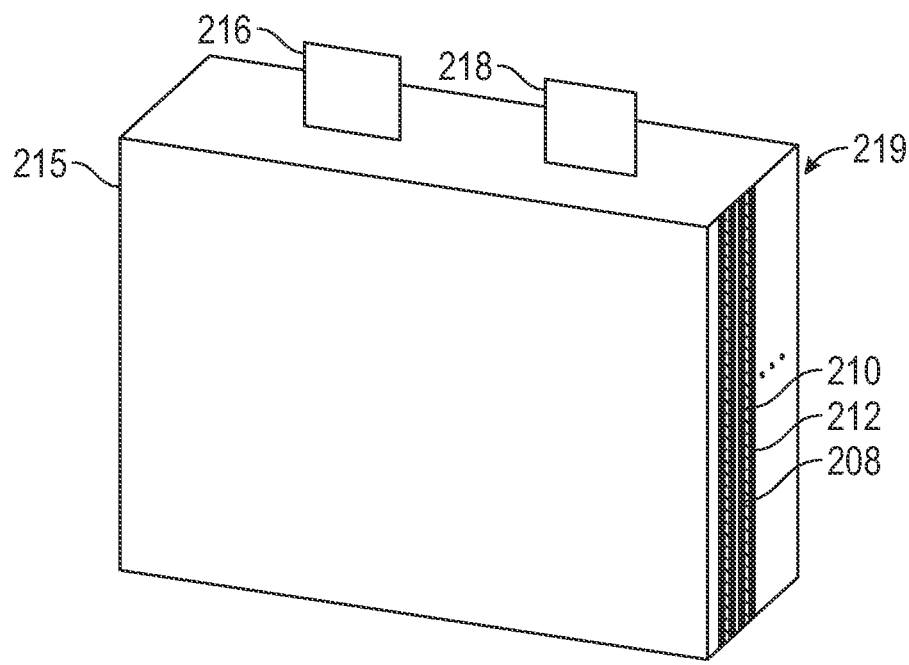
FIG. 2F illustrates a cross-sectional perspective view of a pouch battery cell in accordance with one or more implementations.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery subassembly may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
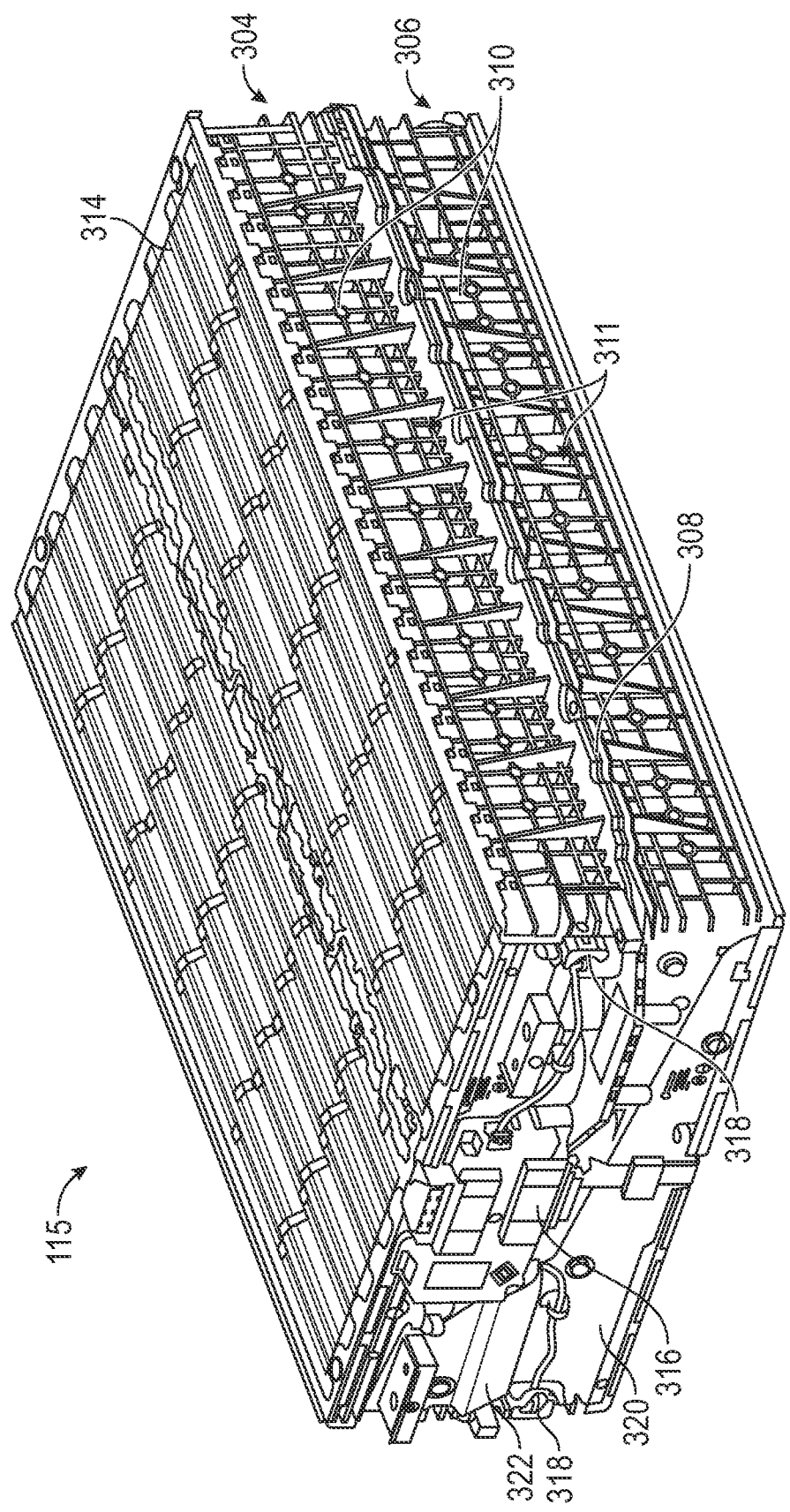
FIG. 3 illustrates a perspective view of a battery module in accordance with one or more implementations.

FIG. 3 illustrates a perspective view of a battery module in accordance with one or more implementations. In the example of FIG. 3, the battery module 115 includes a top submodule 304 and a bottom submodule 306. As shown, each of the top submodule 304 and the bottom submodule 306 may include a cell carrier 310. In one or more implementations, each cell carrier 310 may be a monolithic unitary body (e.g., a molded body formed from plastic and/or other materials), and may include structural features 311 along the sidewalls thereof. These structural features 311 may reinforce the strength of the sidewalls of the carrier, and thereby reduce or eliminate the need for additional structural reinforcing components for the battery module 115, such as shear walls attached to the cell carriers 310. Also visible in FIG. 3 is a cold plate 308 that is disposed between the top submodule 304 and the bottom submodule 306. The cold plate 308 may be in thermal contact with battery cells (not visible in FIG. 3) in the top submodule 304 and battery cells (not visible in FIG. 3) in the bottom submodule 306, to provide thermal control for both the top submodule 304 and the bottom submodule 306.

FIG. 3 also illustrates a cover 314 that may be disposed on a top and/or a bottom of the battery module 115. FIG. 3 also illustrates a balancing voltage and temperature (BVT) module 316 to which multiple thermistor assemblies 318 are communicatively coupled. The BVT can be a modular assembly of various electrical components to monitor or control components of the battery subassembly. For example, the BVT can include a circuit board that is attached to the housing of the BVT. The BVT can have various connectors to couple with, for example, a thermistor that can measure a temperature of the battery subassembly, battery module and/or a battery cell thereof, a voltage sensor or balancer that can sense or control voltage that flows through the battery subassembly, battery module and/or a battery cell thereof, or a communication device that can receive, transmit, or analyze data associated with the battery subassembly, battery module and/or a battery cell thereof. Also shown in FIG. 3 are a busbar 320 (e.g., a positive busbar) that is electrically coupled to first terminals (e.g., the positive terminals) of the battery cells of the top submodule 304 and the bottom submodule 306, and a busbar 322 (e.g., a negative busbar) that is electrically coupled to second terminals (e.g., the negative terminals) of the battery cells of the top submodule 304 and the bottom submodule 306.

Figure 4:
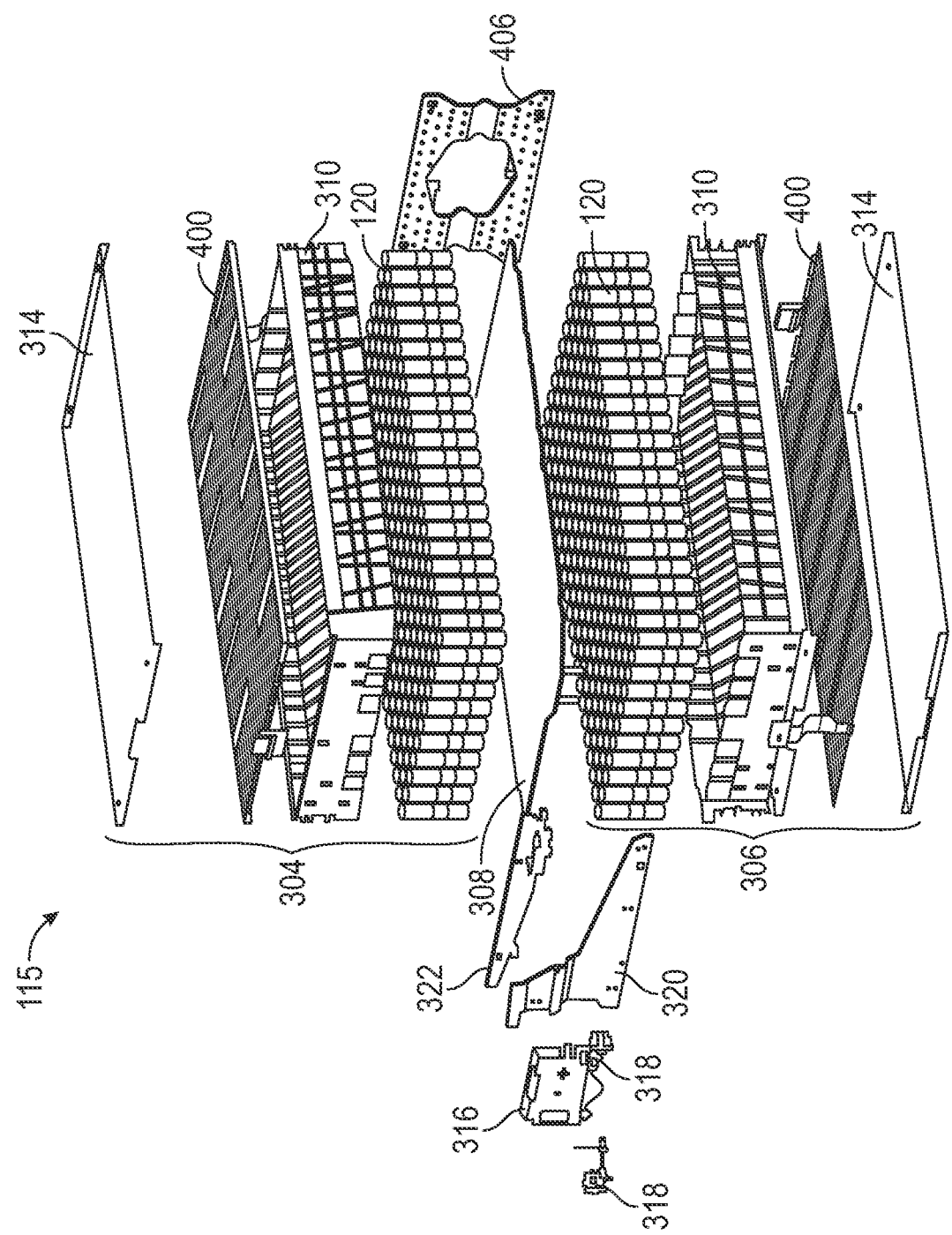
FIG. 4 illustrates an exploded perspective view of the battery module of FIG. 3 in accordance with one or more implementations.

FIG. 4 illustrates an exploded perspective view of the battery module 115 of FIG. 3, in which the battery cells 120 of the top submodule 304 and the battery cells 120 of the bottom submodule 306 can be seen. In one or more examples described herein, the battery module 115, a subset of the components of the battery module 115 (e.g., the top submodule 304, the bottom submodule 306, and/or another subset of the components of the battery module) shown in FIG. 3 and/or FIG. 4, or any other grouping of battery cells (e.g., including a battery pack that includes multiple battery modules and/or other battery subassemblies) may be referred to as a battery subassembly.

In the example of FIG. 4, two current collector assemblies (CCAs) 400 are also visible. As discussed in further detail hereinafter, when the battery module 115 is assembled, the CCAs 400 may connect the terminals of the battery cells 120 of the top submodule 304 and the bottom submodule 306 to the busbar 320 and the busbar 322. As shown in FIG. 4, a series busbar 406 may also be provided (e.g., on an opposing end of the cell carriers 310 from the end of the cell carriers at which the busbar 320 and the busbar 322 are mounted). For example, the series busbar 406 may electrically couple the battery cells 120 of the top submodule 304 to the battery cells 120 of the bottom submodule 306. As shown, a cover 314 may be provided for the top submodule 304 and a cover 314 may be provided for the bottom submodule 306.

The battery cells 120 of the top submodule 304 may be inserted into a crate structure formed by the cell carrier 310 of the top submodule 304, and the battery cells 120 of the bottom submodule 306 may be inserted into a crate structure formed by the cell carrier 310 of the bottom submodule 306. As shown in FIGS. 3 and 4, the orientation of the cell carrier 310 and the battery cells 120 of the top submodule 304 may be substantially opposite (e.g., upside down with respect) to the orientation of the cell carrier 310 and the battery cells 120 of the bottom submodule 306. In this way, a CCA 400 may be provided as or near an outer layer each of the top and bottom submodules, for connection to the terminal(s) of the battery cells 120 disposed therein.

Figure 5:
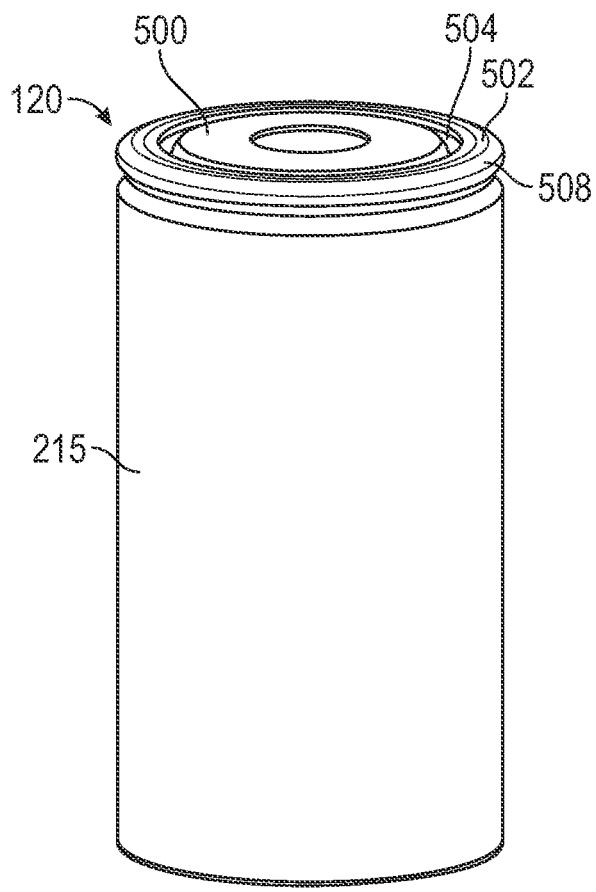
FIG. 5 illustrates a perspective view of an example battery cell in accordance with one or more implementations.

FIG. 5 illustrates a perspective view of an example battery cell 120, implemented as a cylindrical cell with a cylindrical cell housing 215, in accordance with one or more implementations. In the example of FIG. 5, the battery cell 120 includes a cap 508 that includes a central portion 500 and a peripheral rim 502. In one or more implementations, the central portion 500 may be implemented as a first terminal, such as a positive terminal (e.g., terminal 218 of FIG. 2C, coupled to a cathode 212 within the cell housing 215) of the battery cell 120. In one or more implementations, the peripheral rim 502 may be implemented as a second terminal, such as a negative terminal (e.g., a terminal 218 of FIG. 2C, coupled to an anode 208 within the cell housing 215) of the battery cell 120. In one or more implementations, the battery cell 120 may include a gasket 504 that is disposed at least partially beneath the peripheral rim 502. For example, the gasket 504 may seal an internal cavity of the battery cell 120 (e.g., enclosed by the cell housing 215 and the cap 508) from the external environment of the battery cell 120.

Figure 6:
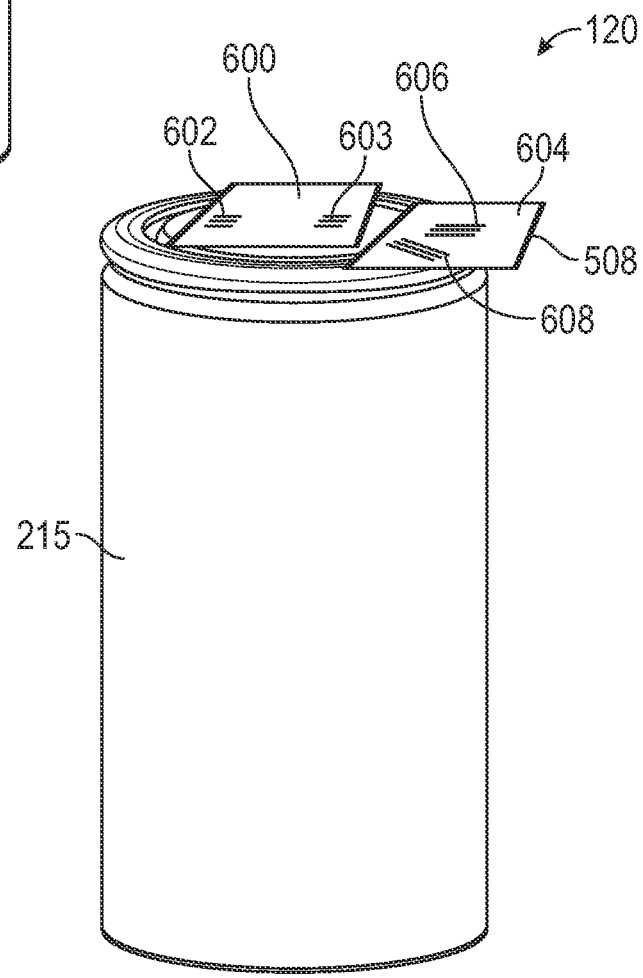
FIG. 6 illustrates a perspective view of the example battery cell of FIG. 5, welded to connectors in accordance with one or more implementations.

FIG. 6 illustrates the example battery cell 120 of FIG. 5 after having been connected to one or more connectors, in accordance with one or more implementations. In the example of FIG. 6, a connector 600 is connected to the central portion 500 of the cap 508 of the battery cell using a weld 602 and a weld 603. In this example, each of the weld 602 and the weld 603 is formed from a set of multiple (e.g., two, three, four, five, or more than five) welds, such as parallel welds. In the example of FIG. 6, a connector 604 is connected to the peripheral rim 502 of the cap 508 of the battery cell using a weld 606 and a weld 608. In this example, each of the weld 606 and the weld 608 is formed from a set of multiple (e.g., two, three, four, five, or more than five) welds, such as parallel welds. In one or more implementations, the connector 600 and/or the connector 604 may be tabs of the current collector assembly (CCA) 400 described herein in connection with FIG. 4.

In the example of FIG. 6, the connector 600 and the connector 604 are each attached to the battery cell by two sets of welds, which may be formed in a double-tap welding process. However, the connector 600 and/or the connector 604 may be attached to the battery cell 120 using one set of welds or more than two sets of welds. For example, FIG. 7 illustrates an implementation in which the connector 604 is attached to the battery cell 120 using three sets of welds (e.g., in a triple-tap welding process), including an additional weld 700 (e.g., an additional set of welds including multiple parallel welds).

For example, in one or more implementations, a testing operation for the battery cell 120 and the connector 604 (e.g., to test the quality of the mechanical and/or electrical properties of the connection between the battery cell 120 and the connector 604) may be performed following the forming of the two sets of welds shown in FIG. 6. In some use cases, based on a result of the testing operation, the two sets of welds may form a sufficient mechanical and/or electrical connection, and the battery subassembly including the battery cell 120 and the connector 604 may be allowed to proceed to a next stage of assembly and/or manufacturing. In other use cases, based on a result of the testing operation, the two sets of welds may be determined to be insufficient, and a third set of welds 700 may be formed between the peripheral rim 502 and the connector 604.

It is also appreciated that the battery cell 120 may be one of multiple (e.g., many, such as tens or hundreds or thousands) of battery cells that may be attached to multiple respective connectors 604 using respective welds, such as welds 606, 608, and/or 700. In an example in which a third set of welds (e.g., welds 700) is used only for battery cells for which two sets of initial welds are determined to be insufficient (e.g., based on testing operations), a battery subassembly (e.g., top submodule 304, bottom submodule 306, battery module 115, and/or battery pack 110) may include one group of battery cells that are attached to respective connectors using two sets of welds and another group of battery cells that are attached to respective connectors using three sets of welds.

Figure 7:
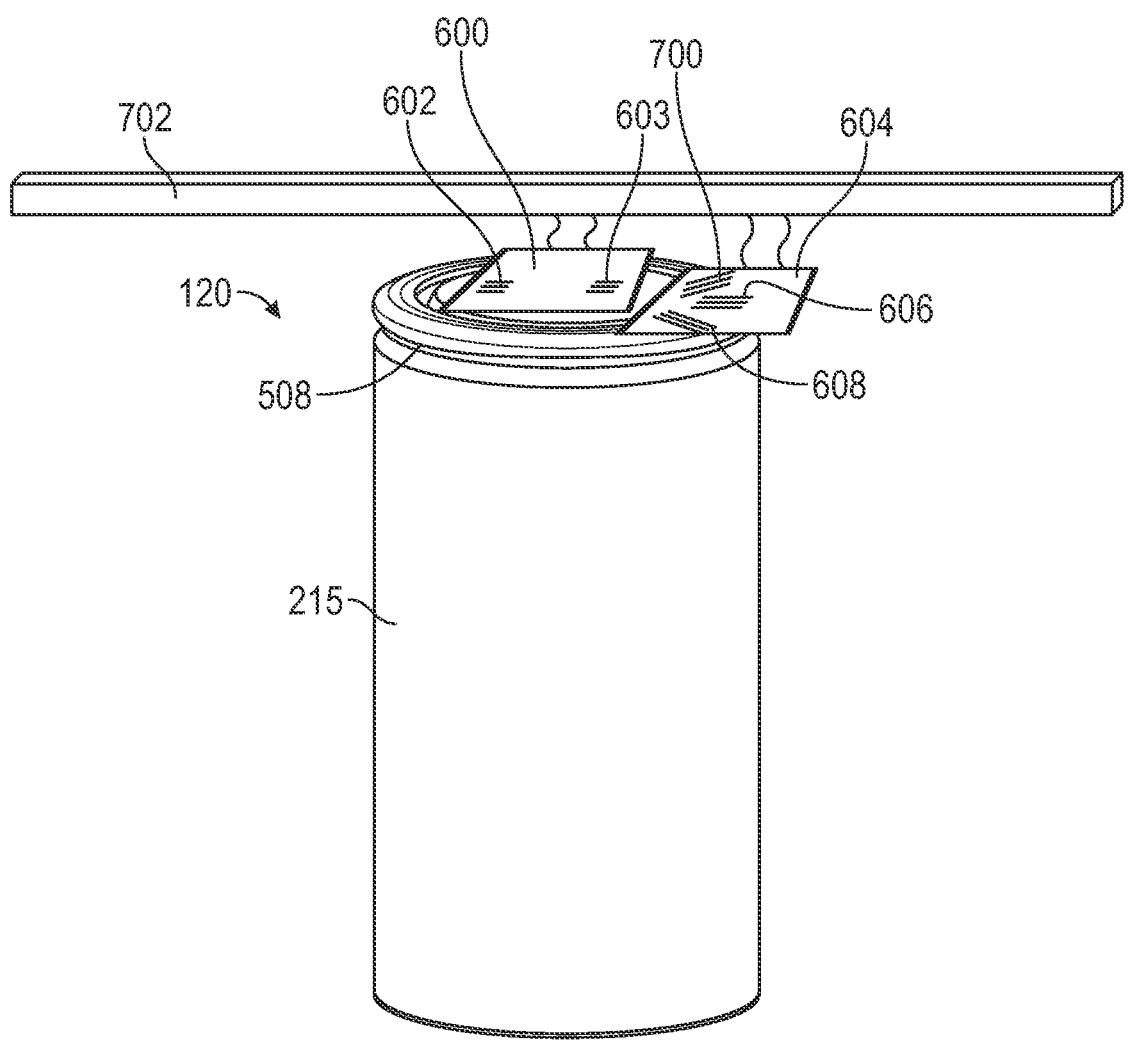
FIG. 7 illustrates a perspective view of the example battery cell of FIG. 6, welded to a connector using triple-tap welding in accordance with one or more implementations.

FIG. 7 also illustrates how the connectors 600 and/or 604 may be implemented as tabs (e.g., conductive foil tabs) that extend from an electrically conductive layer 702. For example, the electrically conductive layer 702 may be an electrically conductive layer of the CCA 400 described herein, from which multiple additional tabs couple to multiple additional battery cells.

Figure 8:
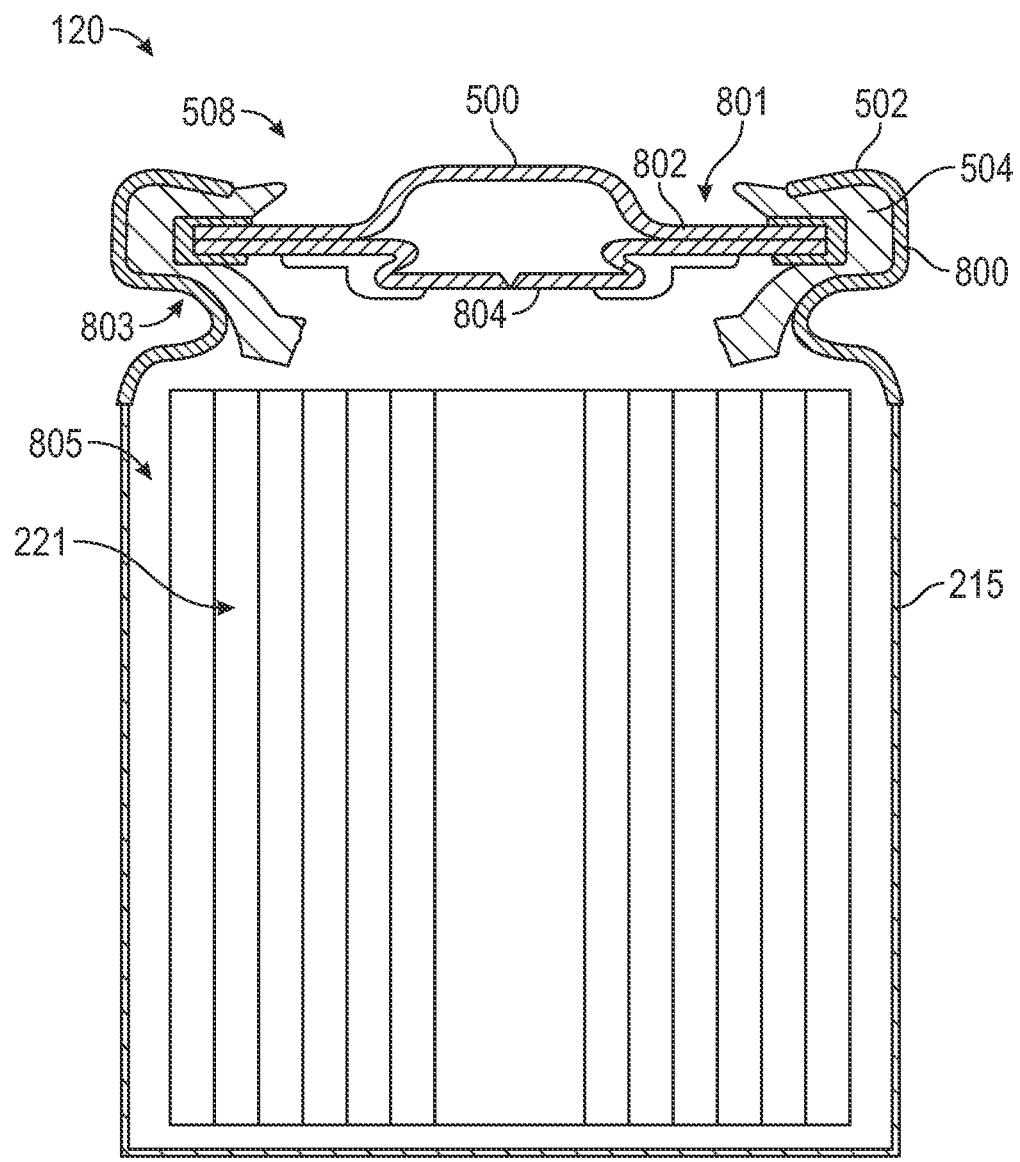
FIG. 8 illustrates a cross-sectional side view of a battery cell in accordance with one or more implementations.

FIG. 8 illustrates a cross-sectional side view of the battery cell 120, in accordance with one or more implementations. In the example of FIG. 8, the battery cell 120 includes the cell housing 215 and the cap 508 that enclose an internal cavity 805, within which the windings 221 of the anode 208 and the cathode 212 (e.g., and electrolyte and/or separator layers) are disposed. As shown, the battery cell 120 may include a cap structure 801 that includes a positive cap 802, formed by the central portion 500, and a current interrupt device (CID) 804. For example, the cathode of the battery cell 120 may be electrically coupled to the central portion 500 via the CID 804. As shown, the gasket 504 may be compressed between the cap structure 801 and an outer housing structure 800, a portion of which forms the peripheral rim 502. For example, the housing structure 800 may be formed from a portion of the cell housing 215 itself, or may be a separate housing structure that is attached to the cell housing 215.

Figure 9:
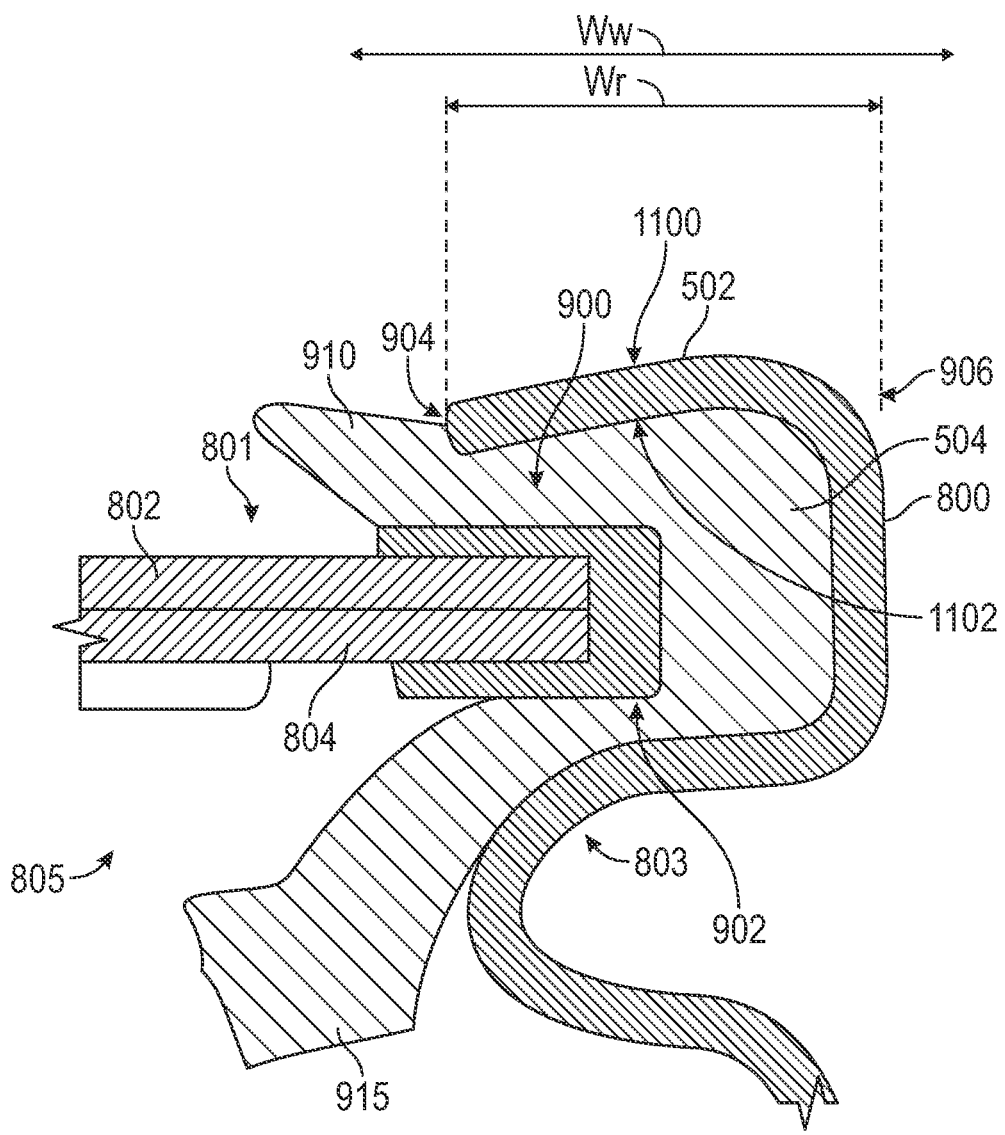
FIG. 9 illustrates a cross-sectional side view of a portion of the battery cell of FIG. 8 in accordance with one or more implementations.

FIG. 9 illustrates a zoomed in view of a portion of the battery cell 120 of FIG. 8. As shown in FIG. 9, a portion of the gasket 504 may be disposed beneath the peripheral rim 502 (e.g., adjacent to and in contact with an inner (e.g., interior) surface 1102 of the peripheral rim 502 that is opposite to an external surface 1100 of the peripheral rim 502 to which the connector 604 may be welded). This portion of the gasket 504 that is disposed beneath the peripheral rim 502 may be compressed between the interior surface of the peripheral rim 502 and a (e.g., top) surface of the cap structure 801 at a first pinch point 900. In one or more implementations, the gasket 504 may be compressed, at the first pinch point 900, by between five percent and fifteen percent of the original thickness of the gasket 504. For example, in one or more implementations, the gasket 504 may be compressed, at the first pinch point 900, to a thickness of between 0.3 millimeters (mm) and 0.7 mm.

As shown, the gasket 504 may also extend around the cap structure 801 and between a neck portion 803 of the housing structure 800 and another (e.g., bottom) surface of the cap structure 801. As shown, another portion of the gasket 504 may be compressed between the other (e.g., bottom) surface of the cap structure 801 and an interior surface of the neck portion 803 of the housing structure 800 at a second pinch point 902. In one or more implementations, the gasket 504 may be compressed, at the second pinch point 902, by between fifteen percent and fifty percent of the original thickness of the gasket 504. For example, in one or more implementations, the gasket 504 may be compressed, at the second pinch point 902, to a thickness of between 0.2 mm and 0.5 mm. In this way, the first pinch point 900 and the second pinch point 902 may provide multiple redundant seals between the internal cavity 805 and the external environment of the battery cell 120. As shown, a portion 915 of the gasket 504 may extend into the cavity 805

As shown in FIG. 9, the peripheral rim 502 may have a width, Wr. For example, the width, Wr, may be defined by a distance between an inner radial edge 904 of the peripheral rim 502 and an outer radial edge 906 of the peripheral rim 502. In one or more implementations, the weld 606, the weld 608, and/or the weld 700 discussed herein in connection with FIGS. 5-7 may have a width, such as a width, Ww, that is larger than the width, Wr, of the peripheral rim 502, as shown in FIG. 9. For example, in one or more implementations, the width, Wr, of the peripheral rim may be between approximately 0.2 mm and 10 mm (e.g., 0.7 mm), and the width, Ww, of the weld 606, the weld 608, and/or the weld 700 may be between approximately 0.4 mm and 12 mm (e.g., 1.2 mm).

As shown in FIG. 9, a portion 910 of the gasket 504 may extend beyond an inner radial edge 904 of the peripheral rim 502 (e.g., and may be exposed to the external environment of the battery cell and/or to welding activity that occurs externally to the battery cell). Because the width, Ww, of the weld 606, the weld 608, and/or the weld 700 may be greater than the width, Wr, of the peripheral rim 502, the process of welding the connector 604 to the peripheral rim 502 may cause the portion 910 of the gasket 504 to be directly targeted by a welding component (e.g., a laser performing the welding process), particularly, for example, in a use case in which the weld(s) are misaligned (e.g., due to alignment offsets introduced by prior manufacturing processes for battery cell and/or battery subassembly). This can cause some part(s) of the portion 910 of the gasket 504 to melt during the welding process and then re-solidify after welding (e.g., in a deformed, or previously melted, configuration).

Figure 10:
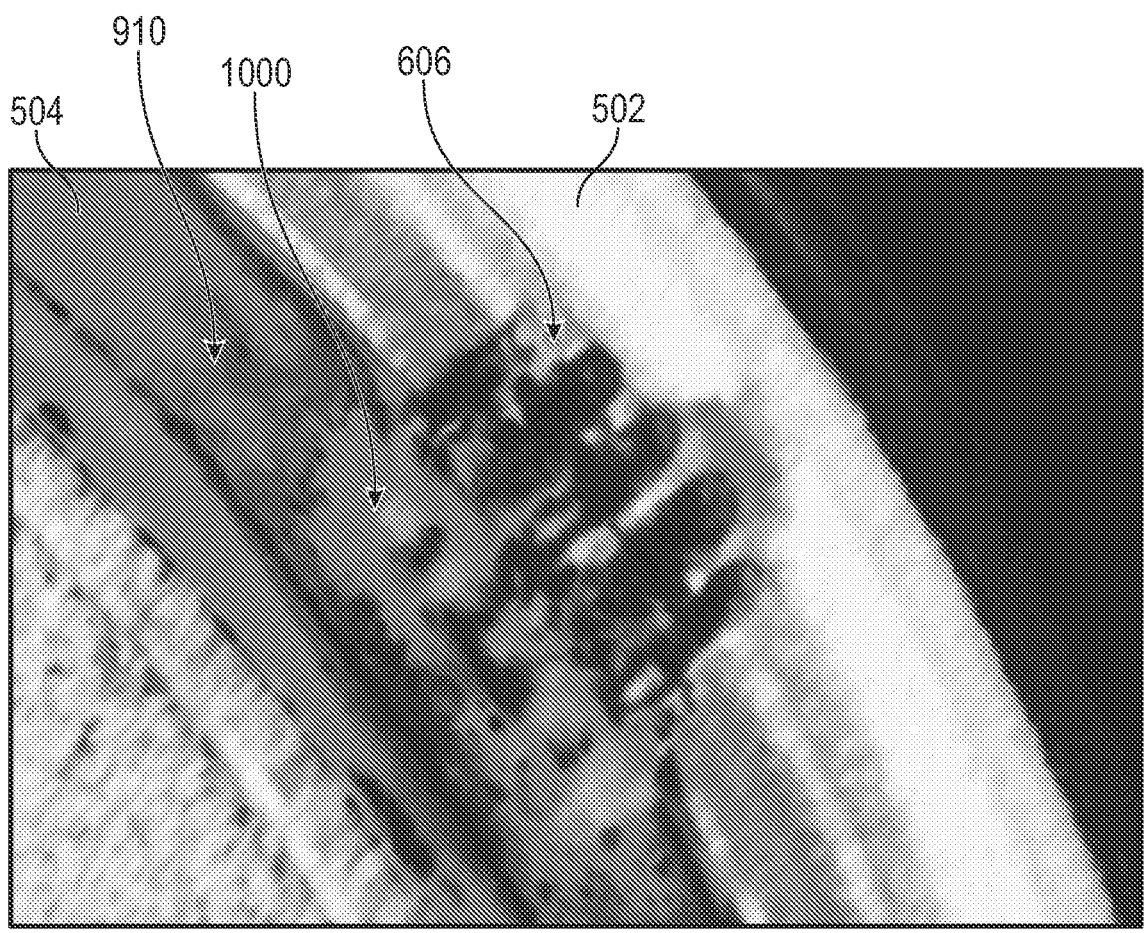
FIG. 10 illustrates a top view of a battery cell having a gasket with an asymmetric portion at a location corresponding to a weld in accordance with one or more implementations.

For example, the melting and re-solidifying of a portion of the gasket 504 at the location of the weld 606, the weld 608, and/or the weld 700 can cause the gasket to include an asymmetric portion at or near the location of one or more welds. For example, the gasket 504 may be a substantially circumferentially (azimuthally) and/or radially symmetric gasket prior to the welding process and, may include, following the welding, a circumferentially (azimuthally) and/or radially asymmetric portion (e.g., a deformed portion) at or near the location of a weld on the peripheral rim 502, due to a previous melting of that portion. For example, FIG. 10 illustrates an example in which a portion 1000 of the portion 910 of the gasket 504 is asymmetric (e.g., deformed, or previously melted) at the location of a weld 606 on the peripheral rim 502.

Figure 11:
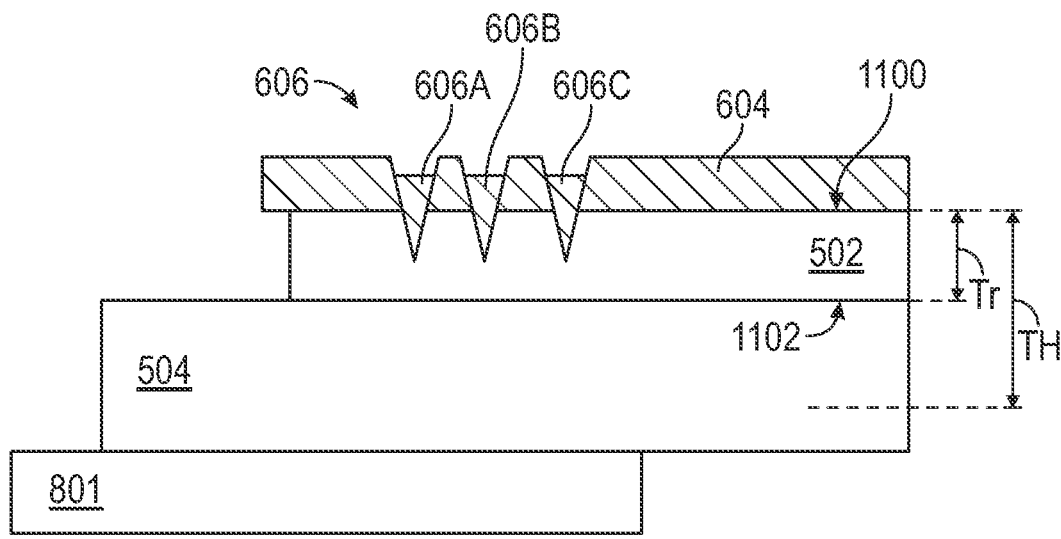
FIG. 11 illustrates a cross-sectional side view of a portion of a battery cell showing welds having a depth of less than a threshold depth in accordance with one or more implementations.

FIG. 11 illustrates a cross-sectional view of a portion of the battery cell 120, in which the depth of one or more welds can be seen, in accordance with one or more implementations. As shown in FIG. 11, the peripheral rim 502 may have a thickness, Tr (e.g., extending from an external surface 1100, such as a top surface of the peripheral rim 502, to an inner surface 1102, such as a bottom surface, of the peripheral rim 502). For example, in one or more implementations, the thickness, Tr, may be between 0.2 mm and 0.5 mm. As shown, a threshold depth, TH, may be set for welds to the peripheral rim 502, that is larger than the thickness, Tr, of the peripheral rim 502. For example, in a process for welding a connector 604 to the peripheral rim 502, the weld(s) can be allowed to penetrate, in some instances, entirely through the peripheral rim 502 (e.g., without causing the battery cell and/or a battery subassembly in which the battery cell is disposed from being scrapped and/or prevented from being implemented, such as in an electric vehicle or battery pack). For example, in one or more implementations, the threshold depth, TH, may be as much as, or more than 0.6 mm.

In the example of FIG. 11, the weld 606 that connects the connector 604 to the peripheral rim 502 includes multiple parallel welds 606A, 606B, and 606C, each of which penetrates to a depth that is less than both the thickness, Tr, of the peripheral rim 502 and the threshold TH. However, in the example of FIG. 12, the weld 606 that connects the connector 604 to the peripheral rim 502 includes multiple parallel welds 606D, 606E, and 606F. In this example, weld 606E penetrates to a depth that is less than both the thickness, Tr, of the peripheral rim 502 and the threshold TH, the weld 606F penetrates to a depth that is similar or equal to the thickness, Tr, of the peripheral rim 502 and less than the threshold TH, and the weld 606D penetrates to a depth that is more than the thickness, Tr, of the peripheral rim 502 and less than the threshold TH. In both of the examples of FIGS. 11 and 12, because the welds 606 do not penetrate beyond the threshold depth TH, the resulting battery subassembly, with the connector 604 attached to the peripheral rim 502 using the welds 606, may proceed to a next stage of manufacturing for a battery subassembly, a battery module, a battery pack, and/or an electric vehicle.

Figure 12:
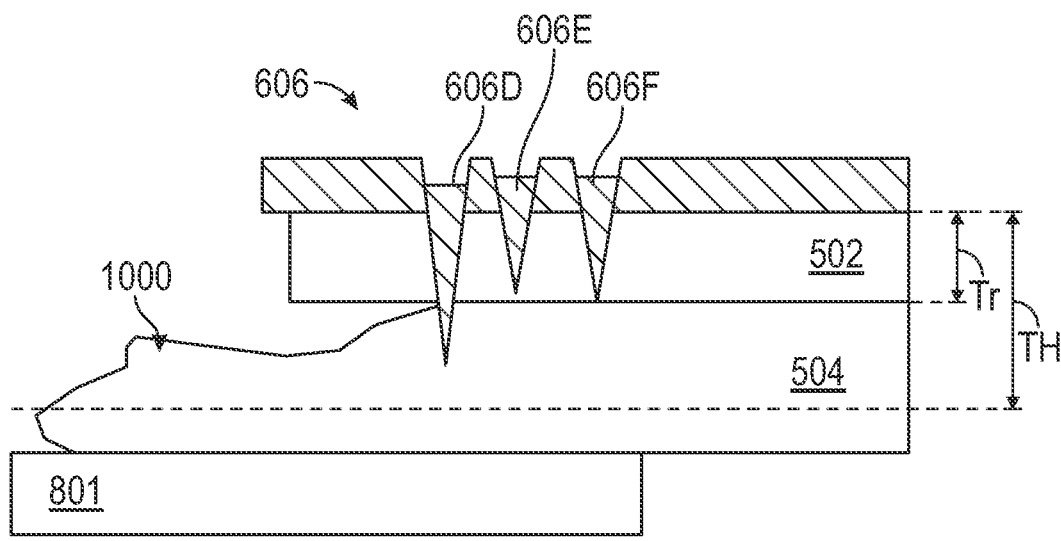
FIG. 12 illustrates a cross-sectional side view of a portion of a battery cell showing a weld that extends through peripheral rim of a battery cell in accordance with one or more implementations.

As shown in the example of FIG. 12, in a battery subassembly in which one or more welds (e.g., weld 606D) penetrate through the peripheral rim 502, a portion (e.g., portion 1000) of the gasket 504 may be melted during the welding, and thus become asymmetric and/or deformed. In this way, some battery subassemblies (e.g., battery modules 115 and/or portions thereof) may be provided that include some battery cells 120 with gaskets 504 that include asymmetric portions 1000 caused by a previous melting and re-solidifying of a portion of the gasket 504 by a weld that penetrates through the peripheral rim 502 (e.g., in addition to one or more battery cells 120 that include asymmetric portions 1000 cause by welds, such as misaligned welds, that directly hit the portion 1000 of the gasket 504). However, because the battery cells 120 include at least the additional seal at the second pinch point 902, even battery cells with gaskets 504 with asymmetric (e.g., deformed and/or previously melted) portions 1000 may be within acceptable operational and safety thresholds and may be included in a completed battery subassembly, such as a top submodule 304, a bottom submodule 306, and/or a battery module 115.

As illustrated by the examples of FIGS. 5-12, in one or more implementations, an apparatus (e.g., a battery subassembly, such as a top submodule 304, a bottom submodule 306, a battery module 115, a battery pack 110, a vehicle 100, and/or a building 180), may be provided that includes a battery cell 120 with a peripheral rim 502 having a first width (e.g., width, Wr) and forming a terminal 216 for the battery cell; and at least one weld (e.g., weld 606) configured to couple the peripheral rim 502 to a connector 604, in which the at least one weld has a second width (e.g., width, Ww) that is larger than the first width. For example, the at least one weld may extend from an inner radial edge 904 to an outer radial edge 906 of the peripheral rim 502. For example, the peripheral rim may form a negative terminal for the battery cell.

In one or more implementations, the battery cell may also include a gasket 504 disposed at least partially beneath the peripheral rim 502. In one or more implementations, the gasket 504 includes an asymmetric portion 1000 at a location corresponding to the at least one weld. In one or more implementations, the at least one weld extends from a top surface (e.g., external surface 1100) of the peripheral rim 502 through the peripheral rim 502 to a bottom surface (e.g., inner surface 1102) of the peripheral rim. In one or more implementations, the at least one weld extends through the bottom surface (e.g., inner surface 1102) of the peripheral rim 502 into a portion of the gasket 504 that is disposed beneath the peripheral rim 502 (e.g., as shown in FIG. 12).

In one or more implementations, the connector may be implemented as a tab of a current collector assembly 400. In one or more implementations, the first width is between 0.5 millimeters and 0.8 millimeters, and the second width is greater than one millimeter. In one or more implementations, the at least one weld may include a first set of parallel welds 606 configured to couple the peripheral rim 502 to the connector 604. In one or more implementations, the at least one weld may also include a second set of parallel welds 608 configured to couple the peripheral rim 502 to the connector 604. In one or more implementations, the at least one weld may include a third set of parallel welds 700 configured to couple the peripheral rim 502 to the connector 604.

As illustrated by the examples of FIGS. 5-12, in one or more implementations, a battery subassembly (e.g., a top submodule 304, a bottom submodule 306, a battery module 115, or a battery pack 110), may be provided that includes a current collector assembly 400 with an electrically conductive layer 702 and a tab (e.g., connector 604) extending from the electrically conductive layer 702; a battery cell 120 having a peripheral rim 502 having a first width (e.g., width, Wr) and forming a terminal 216 for the battery cell 120; and at least one weld (e.g., weld 606) configured to couple the peripheral rim 502 to the tab (e.g., connector 604), in which the at least one weld has a second width (e.g., width, Ww) that is larger than the first width. In one or more implementations, the battery subassembly may include an additional battery cell 120 with an additional peripheral rim 502 having the first width (e.g., width, Wr) and forming an additional terminal 216 for the additional battery cell 120; and at least one additional weld (e.g., an additional weld 606) that couples the additional peripheral rim 502 of the additional battery cell 120 to the tab (e.g., connector 604), in which the at least one additional weld has the second width (e.g., width, Ww) that is larger than the first width.

In one or more implementations, the battery subassembly may also include a plurality of additional battery cells 120 attached to a plurality of additional respective tabs (e.g., additional connectors 604) of the current collector assembly 400 by a plurality of additional respective welds (e.g., additional welds 606), in which each of the plurality of additional battery cells 120 has a peripheral rim 502 with the first width, each of the plurality of additional respective welds has the second width, and each of a subset of the plurality of additional battery cells 120 includes a gasket 504 having an asymmetric portion 1000. For example, others of the plurality of additional battery cells 120 may include gaskets 504 without asymmetric portions. In one or more implementations, the battery subassembly may also include a plurality of additional battery cells 120 attached to a plurality of additional respective tabs (e.g., additional connectors 604) of the current collector assembly 400 by a plurality of additional respective welds (e.g., additional welds 606), in which each of the plurality of additional battery cells 120 has a peripheral rim 502 with the first width, each of the plurality of additional respective welds has the second width, and each of a subset of the plurality of respective additional welds extends through an entire thickness (e.g., thickness, Tr) of a respective peripheral rim 502 of a respective one of the plurality of additional battery cells 120. For example, others of the plurality of additional battery cells 120 may include peripheral rims 502 without welds that penetrate entirely therethrough (e.g., with welds that penetrate only partially therethrough).

In one or more implementations, the battery subassembly may also include a plurality of additional battery cells 120 attached to a plurality of additional respective tabs (e.g., additional connectors 604) of the current collector assembly 400 by a plurality of additional respective welds (e.g., additional welds 606), in which each of the plurality of additional battery cells 120 has a peripheral rim 502 with the first width, each of the plurality of additional respective welds has the second width, each of a first group of the plurality of additional respective welds includes two sets of additional welds (e.g., welds 606 and 608), and each of a second group of the plurality of additional respective welds includes three sets of additional welds (e.g., welds 606, 608, and 700).

Figure 13:
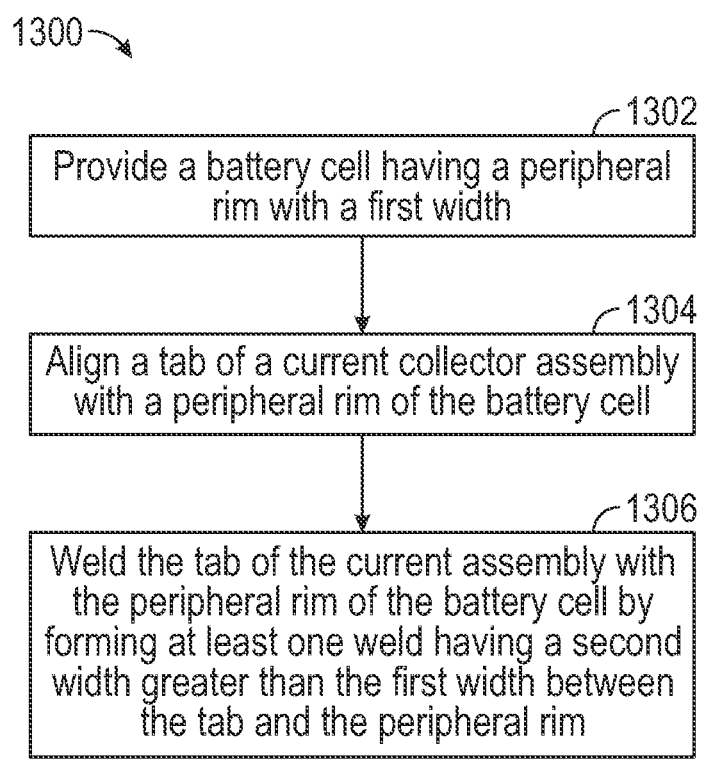
FIG. 13 is a flow chart of illustrative operations that may be performed for manufacturing a battery subassembly in accordance with one or more implementations.

FIG. 13 illustrates a flow diagram of an example process 1300 that may be performed for manufacturing a battery subassembly, such as a battery module, in accordance with implementations of the subject technology. For explanatory purposes, the process 1300 is primarily described herein with reference to the battery cells 120 and the current collector assembly (CCA) 400 described herein. However, the process 1300 is not limited to the battery cells 120 and the current collector assembly (CCA) 400 described herein, and one or more blocks (or operations) of the process 1300 may be performed for one or more other components of other suitable apparatuses, devices, or systems. Further for explanatory purposes, some of the blocks of the process 1300 are described herein as occurring in serial, or linearly. However, multiple blocks of the process 1300 may occur in parallel. In addition, the blocks of the process 1300 need not be performed in the order shown and/or one or more blocks of the process 1300 need not be performed and/or can be replaced by other operations.

As illustrated in FIG. 13, at block 1302, a battery cell (e.g., battery cell 120) having a peripheral rim (e.g., peripheral rim 502) with a first width (e.g., a width, Wr) may be provided or obtained. Obtaining the battery cell may include obtaining multiple battery cells. Obtaining multiple battery cells may include obtaining multiple battery cells 120 that are disposed in a cell carrier 310.

At block 1304, a tab (e.g., connector 604) of a current collector assembly (e.g., current collector assembly 400) may be aligned with the peripheral rim of the battery cell. For example, aligning the tab of the CCA to the peripheral rim of the battery cell may include aligning the multiple tabs of the CCA to multiple peripheral rims of multiple battery cells (e.g., disposed in a cell carrier). For example, aligning the tab with the peripheral rim of the battery cell may include mounting the CCA to a cell carrier within which the battery cell is disposed (e.g., using alignment and/or datuming features of the cell carrier, the CCA, and/or other components of a battery subassembly). In one or more implementations, computer vision equipment and/or an operator may be used to align the tab of the CCA with the peripheral rim of the battery cell.

At block 1306, the tab of the current collector assembly may be welded to the peripheral rim of the battery cell by forming at least one weld (e.g., a weld 606) having a second width (e.g., a width, Ww) greater than the first width between the tab and the peripheral rim. In one or more implementations, forming the at least one weld having the second width greater than the first width between the tab and the peripheral rim may include forming two sets of parallel welds (e.g., welds 606 and 608), each of the two sets of parallel welds having the second width greater than the first width. In one or more implementations, the process 1300 may also include performing a testing operation for the battery cell and the tab (e.g., to determine a quality of the two sets of parallel welds) following the forming of the two sets of parallel welds; and forming, based on a result of the testing operation (e.g., based on a determination that the quality of one or more of the two sets of welds is below a quality threshold), a third set of parallel welds (e.g., weld 700) between the peripheral rim and the tab, the third set of parallel welds having the second width greater than the first width. In one or more implementations, the testing operations may include electrical testing operations that test the electrically connection between the CCA and the battery cell via the two sets of parallel welds. In one or more implementations, the testing operations may also, or alternatively, include mechanical testing operations that test the mechanical attachment between the CCA and the battery cell via the two sets of parallel welds.

Aspects of the subject technology can help reduce the cost and/or complexity of manufacturing electric vehicles, and can improve the reliability and efficiency of electrical connections to the batteries of the electric vehicle. This can help facilitate the functioning of and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising: a battery cell comprising a peripheral rim defining an inner radial edge and an outer radial edge, the peripheral rim having a rim width from the inner radial edge to the outer radial edge and forming a terminal for the battery cell; and at least one weld configured to couple the peripheral rim to a connector, wherein the at least one weld has a weld width that is larger than the rim width such that the at least one weld extends beyond at least one of the inner radial edge or the outer radial edge of the peripheral rim; wherein the rim width is between 0.5 millimeters and 0.8 millimeters, and wherein the weld width is greater than one millimeter.

2. The apparatus of claim 1, wherein the battery cell further comprises a gasket disposed at least partially beneath the peripheral rim.

3. The apparatus of claim 2, wherein the gasket comprises an asymmetric portion at a location corresponding to the at least one weld.

4. The apparatus of claim 3, wherein the at least one weld extends from a top surface of the peripheral rim, through the peripheral rim, to a bottom surface of the peripheral rim.

5. The apparatus of claim 4, wherein the at least one weld extends through the bottom surface of the peripheral rim into a portion of the gasket that is disposed beneath the peripheral rim.

6. The apparatus of claim 1, wherein the connector comprises a tab of a current collector assembly.

7. The apparatus of claim 1, wherein the at least one weld comprises a first set of parallel welds configured to couple the peripheral rim to the connector.

8. The apparatus of claim 7, wherein the at least one weld further comprises a second set of parallel welds configured to couple the peripheral rim to the connector.

9. The apparatus of claim 8, wherein the at least one weld comprises a third set of parallel welds configured to couple the peripheral rim to the connector.

10. A battery subassembly, comprising: a current collector assembly comprising an electrically conductive layer and a tab extending from the electrically conductive layer; a battery cell comprising a peripheral rim defining an inner radial edge and an outer radial edge, the peripheral rim having a rim width from the inner radial edge to the outer radial edge and forming a terminal for the battery cell; and at least one weld configured to couple the peripheral rim to the tab, wherein the at least one weld has a weld width that is larger than the rim width such that the at least one weld extends beyond at least one of the inner radial edge or the outer radial edge of the peripheral rim; wherein the rim width is between 0.5 millimeters and 0.8 millimeters, and wherein the weld width is greater than one millimeter.

11. The battery subassembly of claim 10, further comprising:
an additional battery cell comprising an additional peripheral rim having the rim width and forming an additional terminal for the additional battery cell; and
at least one additional weld that couples the additional peripheral rim of the additional battery cell to the tab, wherein the at least one additional weld has the weld width that is larger than the rim width.

12. The battery subassembly of claim 10, further comprising:
a plurality of additional battery cells attached to a plurality of additional respective tabs of the current collector assembly by a plurality of additional respective welds, wherein each of the plurality of additional battery cells has the peripheral rim with the rim width, wherein each of the plurality of additional respective welds has the weld width, and wherein each of a subset of the plurality of additional battery cells comprises a gasket having an asymmetric portion.

13. The battery subassembly of claim 10, further comprising:
a plurality of additional battery cells attached to a plurality of additional respective tabs of the current collector assembly by a plurality of additional respective welds, wherein each of the plurality of additional battery cells has the peripheral rim with the rim width, wherein each of the plurality of additional respective welds has the weld width, and wherein each of a subset of the plurality of respective additional welds extends through an entire thickness of a respective peripheral rim of a respective one of the plurality of additional battery cells.

14. The battery subassembly of claim 10, further comprising:
a plurality of additional battery cells attached to a plurality of additional respective tabs of the current collector assembly by a plurality of additional respective welds, wherein each of the plurality of additional battery cells has the peripheral rim with the rim width, wherein each of the plurality of additional respective welds has the weld width, wherein each of a first group of the plurality of additional respective welds comprises two sets of additional welds, and wherein each of a second group of the plurality of additional respective welds comprises three sets of additional welds.

15. A method, comprising: providing a battery cell having a peripheral rim defining an inner radial edge and an outer radial edge, the peripheral rim having a rim width from the inner radial edge to the outer radial edge; aligning a tab of a current collector assembly with a peripheral rim of the battery cell; and welding the tab of the current collector assembly with the peripheral rim of the battery cell by forming at least one weld between the tab and the peripheral rim, the at least one weld having a weld width greater than the rim width, such that the at least one weld extends beyond at least one of the inner radial edge or the outer radial edge of the peripheral rim; wherein the rim width is between 0.5 millimeters and 0.8 millimeters, and wherein the weld width is greater than one millimeter.

16. The method of claim 15, wherein forming the at least one weld having the weld width greater than the rim width between the tab and the peripheral rim comprises forming two sets of parallel welds, each of the two sets of parallel welds having the weld width greater than the rim width.

17. The method of claim 16, further comprising:
performing a testing operation for the battery cell and the tab following the forming of the two sets of parallel welds; and
forming, based on a result of the testing operation, a third set of parallel welds between the peripheral rim and the tab, the third set of parallel welds having the weld width greater than the rim width.

18. The method of claim 15, wherein forming the at least one weld having the weld width greater than the rim width between the tab and the peripheral rim comprises melting and partially deforming a portion of a gasket disposed at least partially beneath the peripheral rim.

* * * * *